United States Patent Office 3,443,890
Patented May 13, 1969

3,443,890
PROCESS FOR THE PRODUCTION OF
CALCIUM CARBONATE
Cecil G. Sisson and James L. Foster, Painesville, and
Clyde B. Myers, Mentor, Ohio, assignors to Diamond
Shamrock Corporation, a corporation of Delaware
No Drawing. Filed Dec. 5, 1966, Ser. No. 598,958
Int. Cl. C01f 11/18
U.S. Cl. 23—66                                    5 Claims

ABSTRACT OF THE DISCLOSURE

The present invention relates to a process whereby particles of precipitated calcium carbonate of extremely small particle size are obtained by carbonation with carbon dioxide of an aqueous calcium hydroxide suspension containing from 40 to 150 grams $Ca(OH)_2$ per liter within a temperature range of 20° to 75° C. in the presence of a combination of additive ingredients. These additives include a combination of (1) from 0.2 to 5 percent, by weight of a monosaccharide, disaccharide or monocarboxylic polyhydroxy alcohol with (2) from 0.2 to 5 percent, by weight of $SiO_2$, in an active form, or solubilized starch. The resultant calcium carbonate product is especially useful as a reinforcing filler for rubber and synthetic elastomers.

---

This invention relates to a process for the production of precipitated calcium carbonate of uniform and extremely fine ultimate particle size.

The use of calcium carbonate as reinforcing fillers, particularly in the rubber and synthetic elastomer industries, is well known. In order that they exert a reinforcing effect on the material in which they are incorporated, it is necessary that these fillers have an extremely fine particle size and be readily dispersible.

The use of a variety of additives to control the ultimate particle size of the calcium carbonate obtained by the reaction of carbon dioxide with a calcium hydroxide suspension is described in the prior art. There are inherent in certain of these procedures, however, disadvantages which have limited their commercial acceptance.

In one method, the use of monosaccharides, disaccharides and certain polyhydroxy alcohols is advised in order that the desired finely-divided particles may be obtained over a wide range of reaction temperatures and calcium hydroxide concentrations. While it is true that particle size control is possible in this manner, the resultant slurry of precipitated calcium carbonate is of such a nature that separation of the fine crystals from the mother liquor by filtration requires such a length of time as to be impractical for commercial purposes.

In another process, silicic acid is added to the calcium hydroxide suspension prior to carbonation. In this manner a modified calcium carbonate having the desired fine particle size is obtained. It has been found, however, that in order to obtain optimum results with this process, certain restrictions must be applied that limit the commercial practicability thereof. For instance, if $Ca(OH)_2$ concentrations substantially exceed 50 grams per liter or if temperatures in excess of 30° C. are used, the product obtained will have a larger than desired particle size and will hence be less useful as a reinforcing filler.

It is an object of the present invention to provide a process for the production of finely-divided, precipitated calcium carbonate.

It is a further object of the present invention to provide a process for the production of finely-divided, precipitated calcium carbonate over a wide range of reaction temperatures and reactant concentrations.

A still further object of the present invention is to provide a process for the production of finely-divided, precipitated calcium carbonate whereby the resultant product may be rapidly and easily separated from the slurry thereof by filtration.

These and other objects will in part become more clear and in part be apparent from the description and claims that follow.

The process of precipitating calcium carbonate from a calcium hydroxide suspension by the action upon said suspension of carbon dioxide is well known. It is also well known that the main factors controlling the ultimate particle size of the calcium carbonate obtained are the temperature at which the reaction takes place and the concentration of the calcium hydroxide suspension. In order to obtain a product having useful properties as a filler, it is necessary that the reaction be conducted at a temperature between 10° and 25° C. and at less than one molar calcium hydroxide concentrations. Obviously the temperature limitation is undesirable from a commercial point of view since this necessitates the use of refrigeration to maintain such low temperatures during the course of a reaction that is exothermic by nature. Likewise, the use of dilute suspensions of calcium hydroxide in what is usually a batch-type operation is also uneconomical. For these reasons a variety of additives to control particle size during the reaction have been suggested as outlined, in part, above. None of these remedies has however, been entirely successful for the reasons hereinabove described.

A process has now been found, however, which allows the precipitation of calcium carbonate to be conducted over such a wide range of temperatures that temperature control is virtually unnecessary and at such reactant concentrations as to be commercially practical while still providing a product for use as a reinforcing filler having properties at least equal to and, in most instances, substantially better than products obtained by other methods. More particularly, it has now been found that a precipitated calcium carbonate having a substantially uniform ultimate particle size of less than 0.1 micron, preferably about 0.07 micron or less, and excellent reinforcing properties when used as a filler, may be obtained by carbonating an aqueous calcium hydroxide suspension, containing from about 40 to 150 grams of calcium hydroxide per liter at a temperature of from about 20° to 75° C. and in the presence of from about 0.2 to 5 percent, by weight, on a calcium carbonate basis, of a first additive compound selected from the group consisting of monosaccharides, disaccharides, and monocarboxylic polyhydroxy alcohols and from about 0.2 to 5 percent by weight, on a calcium carbonate basis, of a second additive compound selected from the group consisting of active $SiO_2$, compounds capable of supplying active $SiO_2$, and solubilized starch.

While certain of the above additive ingredients have been used alone in calcium carbonate filler production, the selective combination of same has not heretofore been suggested and has been found to yield surprisingly good results in terms of reaction conditions and product characteristics. Now, not only has the reaction parameters been broadened and improved upon, but also the products obtained by the practice of the present invention are of the desired fine average ultimate particle size and also are to be noted for their uniformity of particle size, thereby making their reinforcing effect, when used as fillers, more predictable. Thus, while heretofore the saccharides have been used to control particle size and while they have been effective for same, they have not seen much use since the resultant product is, for all practical purposes, unfilterable. Likewise, active silicic acid has been proposed as an additive but has required, in order to obtain the desired uniform, ultrafine product, that rigid temperature and concentration limits be imposed i.e., 10° to 30° C. and 0.5 molar $Ca(OH)_2$.

As mentioned above, a characteristic of the products obtained by the practice of the present invention is that, in addition to the extremely fine particle size obtainable, it is also true that there is a remarkable uniformity of said particle size. Thus, while it is possible that other calcium carbonate fillers may have an average particle size which is shown by count to be comparable to that of the instant products, there are often present in these other fillers a number of particles that are extremely large relative to the average particle size. That is to say, the particle size range of the products of the present invention is much narrower than that of most other calcium carbonate fillers. The significance of this feature will be appreciated if it is realized that, average particle size notwithstanding, these large particles will constitute a disproportionate share of the mass of a given quantity of the filler. This, coupled with the fact that said large particles are of no value as reinforcing agents, will lead one skilled in the art to understand the benefits afforded by the controlled and uniform particle size calcium carbonates now obtainable through the practice of this invention.

A further advantage which may be obtained by using the products of the present invention as reinforcing fillers as, for example, in ethylene-propylene terpolymers, is that of rapid cure time. That is to say that the optimum results, as evidenced by physical tests on the reinforced elastomers, are attained after only relatively brief cure times, e.g., 15 minutes or less at 307° C. and using 100 parts elastomer and 100 parts filler.

The first additive compound is selected from the group consisting of the monosaccharides, disaccharides, and monocarboxylic polyhydroxy alcohols. Illustrative of the monosaccharides useful in the present invention are glucose, fructose, galactose and mannose. Among the disaccharides are sucrose, lactose and maltose. A typical monocarboxylic polyhydroxy alcohol is gluconic acid. Especially preferred at this time are sucrose, glucose and gluconic acid.

As stated above, these first additive compounds are useful in the range of from about 0.2 to 5 percent by weight. These percentages are based on the theoretical weight of dry calcium carbonate to be produced. The theoretical amount of $CaCO_3$ to be produced is readily calculated from the initial $Ca(OH)_2$ concentration, i.e., for every 74 grams of $Ca(OH)_2$, 100 grams of $CaCO_3$ may be obtained. While determination of the exact quantity of the first additive to be used will vary with the actual reaction conditions encountered and may be readily determined by experimentation, generally speaking the quantity required to be effective in the instant invention increases in direct proportion to increasing temperature and concentration.

The second additive compound is selected from the group consisting of active $SiO_2$, compounds capable of supplying active $SiO_2$ and solubilized starch. By active $SiO_2$ it is intended to include only $SiO_2$ in an active form such as is supplied by freshly precipitated silicic acid or an alkali metal silicate. Especially preferred at this time is an aqueous commercial solution of sodium silicate, e.g., one having a solids content of 35 to 45 percent by weight and an $Na_2O:SiO_2$ weight ratio of 1:3 to 1:4. By the term solubilized starch it is intended to refer to starches that have been modified by chemical agents, enzymes, treatments, etc. to give a product soluble or dispersible in warm water.

The active $SiO_2$ and solubilized starch additives are essentially equivalent for the purposes of this invention. It has been found, however, that while they are equally effective when the process proceeds rapidly from the addition of the second additive to the suspension till completion of the precipitation and filtration steps, if a substantial lapse of time is to exist before carbonation, the solubilized starch has a tendency to degrade or deteriorate and, therefore, yield an inferior product. Consequently, care must be exercised in choosing which of the second additives to use under various conditions.

The amount of the second additive compound to be used is from about 0.2 to 5 percent, by weight, on a calcium carbonate basis. The actual amount to be used will vary with the operating conditions and can best be determined experimentally to ensure that the optimum benefit is being derived in terms of the reaction and reaction product without using unnecessarily large amounts of additive and thereby increasing raw material costs. Generally speaking, however, the amount of active $SiO_2$ or solubilized starch to be used increases in direct proportion to increasing reaction temperature, suspension concentration and amount of first additive used.

In the case of both the first and second additive compounds the method of addition to the calcium hydroxide suspension is not critical. They may be added separately or in combination as an aqueous solution or without prior dilution or dissolution directly to the suspension and dispersed therein with agitation.

The calcium hydroxide suspension to be carbonated is not required to be of any special nature. Generally the suspension will be composed of crushed, calcined limestone taken up in water from any convenient source. No purification of the limestone or water is required to obtain a resultant product which is perfectly satisfactory for use as a reinforcing filler. In instances, however, where a pure white product is desired, as for compounding with a light colored elastomer, it may be desirable to use a purified calcium hydroxide suspension. This may be accomplished in a number of ways such as controlling the purity of the limestone itself or by obtaining the calcium hydroxide suspension by reacting a calcium salt, such as $CaCl_2$, with caustic. The suspension may have a concentration of from 40 to 150 grams calcium hydroxide per liter, preferably 90 to 125 grams per liter. While use of concentrations of less than 40 grams per liter is possible, large amounts of water must necessarily be handled in the process and consequently these concentrations are of little practical importance. At concentrations in excess of 150 grams per liter the suspension rapidly becomes so viscous during carbonation as to form an immovable gel which may be broken up for further reaction only with difficulty.

The carbon dioxide gas stream used for the actual carbonation reaction may be conveniently obtained by using the gases generated during the calcination of limestone. A gas stream of this type will have a typical $CO_2$ content of 40 percent. Streams of higher or lower $CO_2$ content may be used but are not necessary as purification and concentration can only add to the cost of the operation and dilution would serve to increase the time required for complete reaction.

The rate of addition of the $CO_2$-containing gas stream will, of course, depend upon a number of variables such as $CO_2$ concentration, calcium hydroxide concentration, length of carbonation, degree of agitation and the like. Generally it is desirable to have a rather rapid rate of addition of $CO_2$ as it appears that slow carbonation has a tendency to increase the particle size of the calcium carbonate produced. At this time, with a gas stream containing 40 percent $CO_2$ and a calcium hydroxide concentration of 100 grams per liter, it is preferred to introduce the carbonating gas stream at a rate of from about 140 to 280 liters of gas per liter of suspension per hour.

The progress of the carbonation reaction may be followed by use of a pH meter. Initially, a typical calcium hydroxide suspension will have a pH of 12 to 12.5. As with most reactions of this type, very little change in pH will be noted until the final stages of the reaction when the pH will begin to drop rather rapidly. When the pH reaches a value between 9 and 10 it is advisable to stop the addition of $CO_2$ and allow the suspension to reach an equilibrium.

In order that those skilled in the art may better understand the present invention and the manner in which it may be practiced, the following specific examples are offered.

EXAMPLE 1

To 23.8 kiloliters of an aqueous suspension containing 101 grams per liter calcium hydroxide at a temperature of 31° C. is added 34 kilograms of sucrose and 56.8 liters of an aqueous sodium silicate ($Na_2O:SiO_2$ weight ratio of 1:3.22 and 38.3 percent solids). This corresponds to 0.73 percent $SiO_2$ and 1.05 percent sucrose both by weight on a calcium carbonate basis. A finely-divided gas stream containing about 40 percent $CO_2$ is introduced into the suspension. Carbonation is continued for 1 hour and 34 minutes at which time the suspension has a pH of 9.5 and a temperature of 56° C. The suspension is passed through 300 mesh screen to remove foreign material and from there to a filter. Finally the calcium carbonate is dried at about 150° C. The resultant product has an average ultimate particle size of about 0.06 microns and a particle size range of from 0.02 to 0.24 micron.

EXAMPLE 2

The product of Example 1 is compared to several other calcium carbonate products commercially available for use as reinforcing fillers. Equal amount of the fillers to be evaluated are added to the formulations of ethylene-propylene terpolymer elastomers (EPT) and styrene-butadiene rubber (SB–R) and cured at 307° F. The ratio of filler to EPT is 1:1 and that of the filler to SB–R is 1.5:1. After curing, certain physical tests are conducted for evaluation purposes, i.e., tensile and tear tests.

Multifex MM—Registered trademark of Diamond Alkali Company for precipitated $CaCO_3$.

Calcene TM—Registered trademark of Columbia-Southern Chemical Company for a coated, precipitated $CaCO_3$.

Calcene NC—Registered trademark of Columbia-Southern Chemical Company for an uncoated, precipitated $CaCO_3$.

Purecal M—Registered trademark for Wyandotte Chemicals Corp. for a precipitated $CaCO_3$.

Laminar—Registered trademark of Laminar Corp. for ground, natural $CaCO_3$.

Witcarb R—Registered trademark of Witco Chemical Co., Inc. for precipitated $CaCO_3$.

It can be seen from the above Table I that results superior to those obtained with any of the other fillers are obtained using the product of Example 1 insofar as tear strength is concerned. In addition, the tensile strength of the products reinforced with the filler of the present invention are excellent, exceeded slightly by only one competitive filler. Further, it will be seen that maximum strengths are attained with the product of this invention even at the shortest cure times.

EXAMPLE 3

Three 3200-milliliter batches of calcium hydroxide suspension are prepared and carbonated as indicated in Table II.

TABLE II

| $Ca(OH)_2$ g./l. | Final temperature, °C. | Percent [1] sucrose | Percent [1] sodium silicate [2] | Time required for filtration (minutes) |
|---|---|---|---|---|
| 100 | 43 | 1.0 | | 180 |
| 105 | 38 | | 1.0 | 14 |
| 100 | 46 | 1.0 | 0.67 | 5 |

[1] Weight percent, $CaCO_3$ basis.
[2] $Na_2O:SiO_2=1:3.22$, 38.3% solids.

This example shows the effect of the combination of additives in reducing the filtration rate of the calcium carbonate suspension as opposed to the rate obtained using only one additive.

EXAMPLE 4

To 3200 milliliters of a suspension containing 42 grams of calcium hydroxide per liter of solution is added 1 percent solubilized starch and 0.2 percent sucrose, both percentages being by weight on a calcium carbonate basis. Carbonation, using a gas stream containing 40 percent $CO_2$, is begun at a temperature of 28° C. The reaction is continued until a pH of 9.2 is obtained at which time the temperature has risen to 48° C. The slurry filters rapidly (9 minutes) through #2 grade filter paper in an 18.5 centimeter diameter Buchner funnel using the vacuum obtainable with a standard water aspirator.

TABLE I

| Material | Test | Cure time (min.) | Example 1 | Multifex MM | Calcene TM | Calcene NC | Purecal M | Laminar | Witcarb R |
|---|---|---|---|---|---|---|---|---|---|
| Ethylene-propylene terpolymer. | Tensile [1] (in lbs. per sq. in.). | 15 | 1,310 | 990 | 1,100 | 1,450 | NT | NT | NT |
| | | 20 | 1,310 | 1,100 | 1,150 | 1,500 | NT | NT | NT |
| | | 30 | 1,340 | 870 | 1,080 | 1,470 | NT | NT | NT |
| | | 40 | 1,300 | 800 | 1,050 | 1,370 | NT | NT | NT |
| Do | Tear [2] (in lbs. per sq. in.). | 15 | 121 | 75 | 88 | 126 | NT | NT | NT |
| | | 20 | 95 | 71 | 70 | 102 | NT | NT | NT |
| | | 30 | 78 | 69 | 57 | 83 | NT | NT | NT |
| | | 40 | 83 | 71 | 59 | 77 | NT | NT | NT |
| Styrene-butadiene rubber | Tensile,[1] p.s.i. | 7.5 | 2,670 | 1,870 | 2,010 | 2,800 | 1,220 | 1,700 | 1,170 |
| | | 10 | 2,180 | 1,930 | 2,110 | 2,590 | 1,420 | 1,650 | 1,220 |
| | | 15 | 2,070 | 1,970 | 1,920 | 2,410 | 1,080 | 1,750 | 1,100 |
| | | 30 | 2,140 | 1,700 | 1,810 | 2,550 | 870 | 1,600 | 840 |
| Do | Tear,[2] p.s.i. | 7.5 | 226 | 179 | 213 | 230 | 97 | 116 | 105 |
| | | 10 | 228 | 164 | 226 | 224 | 95 | 130 | 102 |
| | | 15 | 226 | 149 | 205 | 218 | 76 | 111 | 117 |
| | | 30 | 247 | 162 | 168 | 185 | 73 | 106 | 84 |

[1] Tensile test conducted according to ASTM test designation D412-61T.
[2] Tear test conducted according to ASTM designation D624-54.
NT—Not tested.

EXAMPLE 5

A series of experiments is conducted to show the particular effect of the combination of additives useful in the present invention. In each instance 3200 milliliters of a suspension containing 100 grams of calcium hydroxide per liter is carbonated to the indicated final pH using a gas stream containing 40 percent $CO_2$ at a rate of about 450 liters of gas per hour. Other conditions and the results attained appear in Tables III and IV.

TABLE III

| Run | First [1] additive (gms.) | Second [2] additive (gms.) | Temperature (° C.) Start | Temperature (° C.) End | Final pH | Filter rate (min.) |
|---|---|---|---|---|---|---|
| 1 | 4.3 | | 34 | 48 | 9.8 | 22 |
| 2 | | 14.8 | 34 | 48 | 9.4 | 66 |
| 3 | 4.3 | 14.8 | 34 | 48 | 8.7 | 6.5 |
| 4 | 2.2 | 7.4 | 34 | 46 | 9.6 | 7.5 |

[1] Sucrose.
[2] Aqueous sodium silicate having an $Na_2O:SiO_2$ weight ratio of 1:3.22 and containing 38.35 percent solids.

TABLE IV

| Run | Ultimate particle size (microns) Ave. | Ultimate particle size (microns) Range | Settling rate [1] (height of solids) 15 min. | 30 min. | 1 hr. | 2 hr. | 20 hr. |
|---|---|---|---|---|---|---|---|
| 1 | 0.04 | 0.02–0.13 | 99.0 | 98 | 97 | 94 | 70 |
| 2 | | 0.02–1+ | 86.5 | 74 | 52 | 36 | 30 |
| 3 | 0.05 | 0.02–0.12 | 94.5 | 86 | 80 | 72.5 | 52.5 |
| 4 | 0.06 | 0.03–0.15 | 92.0 | 85 | 78 | 69 | 48.5 |

[1] Height in mm. of the settled solids layer.

The settling rate test, referred to in Table IV, is designed to reflect the relative particle sizes of filler samples. The procedure is as follows. To 30 grams of dry filler is added 270 milliliters of distilled water, with swirling to prewet the filler, in the container of a high speed mixer (Hamilton Beach Drinkmaster Model No. 30). Immediately after mixing for 3 minutes, 100 ml. of the slurry is poured into a 100 ml. graduated glass measuring cylinder. Readings are taken at appropriate time intervals recording the degree of settling of the filler. It will be understood that during the settling period a layer of clear supernatant liquid appears on the top with the layer below containing the settled filler material. If the height of the original slurry is taken as 100 percent, then the height of the settled solids layer is a measure of the percent settling. From this test it may be concluded that, in general, the materials having the smaller particle sizes will settle more slowly due to their large surface area.

Run 1 illustrates that although acceptable and uniform particle sizes are obtained using only the first additive, the rate of filtration is so slow as to be unacceptable. Conversely, Run 2 shows that use of only the second additive reduces the time required for filtration but the resultant product contains a number of particles which are so large as to make the product unacceptable for use as a reinforcing filler. In fact, the particle size range is so extreme as to make it impossible to obtain a representative sample in order to determine the average particle size by ordinary methods. Runs 3 and 4, however, show that by using both additives, products having outstanding particle size characteristics are obtained and, moreover, are obtained at excellent filtration rates. The comparatively large particle size of the material of Run 2 is further reflected by the rapid settling rate obtained therewith.

EXAMPLE 6

The use of gluconic acid as the first additive compound is illustrated by adding 4.3 grams of gluconic acid and 14.8 grams of sodium silicate ($Na_2O:SiO_2=1:3.22$, 38.3% solids) to 3.2 liters of a suspension containing 100 grams of $Ca(OH)_2$ per liter. The suspension, having an initial temperature of 34° C., is carbonated to a final pH of 9.5 and at a temperature of 47° C. The resultant product, which was filtered in 10 minutes, has an average ultimate particle size of about 0.05 micron and a particle size range of from 0.02 to 0.13 micron.

EXAMPLE 7

A suspension, as in Example 6, is prepared only substituting 6.4 grams of glucose for the gluconic acid. Carbonation is carried out over a temperature range of 34° to 49° C. to a final pH of 9.8. Six minutes are required for filtration of a product having an average ultimate particle size of 0.06 micron and a particle size range of from 0.03 to 0.13 micron.

It is to be understood that although the invention has been described with specific reference to particular embodiments thereof, it is not to be so limited since changes and alterations may be made therein which are within the full and intended scope of the invention as defined in the appended claims.

What is claimed is:

1. A process for precipitating calcium carbonate which comprises carbonating with carbon dioxide an aqueous suspension containing from about 40 to 150 grams of calcium hydroxide per liter at a temperature of from about 20° C. to 75° C. and in the presence of from about 0.2 to 5 percent, by weight, on a calcium carbonate basis of a first additive compound selected from the group consisting of monosaccharides, disacchardies, and monocarboxylic polyhydroxy alcohols and from about 0.2 to 5 percent, by weight, on a calcium carbonate basis of a second additive compound selected from the group consisting of active $SiO_2$, compounds capable of supplying active $SiO_2$ and solubilized starch.

2. A process as in claim 1 wherein the first additive compound is sucrose.

3. A process as in claim 1 wherein the second additive compound is sodium silicate.

4. A process as in claim 1 wherein the first additive compound is gluconic acid.

5. A process as in claim 1 wherein the second additive compound is solubilized starch.

References Cited

UNITED STATES PATENTS

| 2,188,494 | 1/1940 | Bode | 106—306 |
| 2,188,663 | 1/1940 | McClure et al. | 23—66 |
| 2,372,402 | 3/1945 | Stokes et al. | 23—64 |
| 2,383,509 | 8/1945 | Rafton | 106—306 |
| 2,564,992 | 8/1951 | Pechukas | 106—306 |
| 3,133,824 | 5/1964 | Podschus | 23—66 X |
| 3,373,134 | 3/1968 | Yasui et al. | 23—66 X |

OSCAR R. VERTIZ, *Primary Examiner.*

G. T. OZAKI, *Assistant Examiner.*

U.S. Cl. X.R.

23—304; 106—306